United States Patent [19]

Bachmann

[11] Patent Number: 4,468,413
[45] Date of Patent: Aug. 28, 1984

[54] METHOD OF MANUFACTURING FLUORINE-DOPED OPTICAL FIBERS

[75] Inventor: Peter K. Bachmann, Aachen, Fed. Rep. of Germany

[73] Assignee: U.S. Philips Corporation, New York, N.Y.

[21] Appl. No.: 443,006

[22] Filed: Nov. 19, 1982

[30] Foreign Application Priority Data

Feb. 15, 1982 [DE] Fed. Rep. of Germany ....... 3205345

[51] Int. Cl.$^3$ .......................... B05D 3/06; C23C 11/00
[52] U.S. Cl. ........................................ 427/39; 427/163
[58] Field of Search ................................... 427/39, 163

[56] References Cited

U.S. PATENT DOCUMENTS

| Re. 30,635 | 6/1981 | Kuppers et al. ...................... 427/38 |
| 4,045,198 | 8/1977 | Rau et al. ............................... 65/33 |
| 4,221,825 | 9/1980 | Guerder et al. ................. 427/163 X |

OTHER PUBLICATIONS

Abe, K., "Fluorine Doped Silica for Optical Waveguides," 2nd ECOC, IEE, Paris, 1976.
Ainslie, G. J., et al., "Preparation of Long Lengths of Ultra-Low-Loss Single-Mode Fibre," Electronics Letters, vol. 15, No. 14, pp. 411-413, (Jul. 1979).
Fleming, J. W., et al., "Low-Loss Single-Mode Fibers Prepared by Plasma-Enhanced MCVD," Electronics Letters, vol. 17, No. 23, pp. 867-868, (Nov. 1981).
Geittner, T., et al., "Low-Loss Optical Fibers Prepared by Plasma-Activated Chemical Vapor Deposition (CVD)," Applied Physics Letters, vol. 28, No. 11, pp. 645-646, (1976).
Kuppers, D., et al., "Application of the Plasma-Activated Chemical Vapour Deposition (PCVD) Process to the Preparation of Fluorine Doped Fibres," Third ECOC, Munich, 1977.
Kuppers, D., et al., "Deposition of Fluorine-Doped Silica Layers from a SiCl$_4$/SiF$_4$/O$_2$ Gas Mixture by the Plasma-CVD Method," Journal of the Electrochemical Society: Solid-State Science and Technology, vol. 125, No. 8, pp. 1298-1302, (Aug. 1978).
Muhlich, A., et al., "A New Doped Synthetic Fused Silica as Bulk Material for Low-Loss Optical Fibres," First ECOC, IEE, London, 1975.
Muhlich, A., et al., "Preparation of Fluorine-Doped Silica Preforms by Plasma Chemical Technique," Third ECOC, Munich, 1977.
Rau, K., et al., "Progress in Silica Fibers with Fluorine Dopant," Topical Meeting on Fiber Transmission, IEEE, Williamsburg, 1977.

Primary Examiner—Norman Morgenstern
Attorney, Agent, or Firm—Marc D. Schechter

[57] ABSTRACT

Doped silica glass can be manufactured by reacting gaseous vapors of silica-forming compounds and dopant-forming compounds. Increased fluorine dopant can be provided with less fluorine dopant-forming compound, when the fluorine dopant-forming compound is hexafluoroethane (C$_2$F$_6$).

5 Claims, 2 Drawing Figures

METHOD OF MANUFACTURING FLUORINE-DOPED OPTICAL FIBERS

BACKGROUND OF THE INVENTION

The invention relates to a method of manufacturing fluorine-doped optical fibers.

The use of fluorine as a refractive index decreasing dopant in the manufacture of optical fibers on the basis of fused silica is known from the following patents and publications:

(1) A. Mühlich, K. Rau, F. Simmat, N. Treber, 1st ECOC, IEE, London 1975
(2) K. Abe, 2nd ECOC, IEE, Paris 1976
(3) DE-PS No. 25 38 313 (corresponding to U.S. Pat. No. 4,045,198)
(4) D. Küppers, J. Koenings, H. Wilson, 3rd ECOC, Munich 1977
(5) D. Küppers, J. Koenings, H. Wilson, J. Electrochem. Soc. 125 (1978) 1298
(6) A. Mühlich, K. Rau, N. Treber, 3rd ECOC, Munich 1977
(7) K. Rau, A. Mühlich, N. Treber, Topical Meeting on Fiber Transmission, IEEE, Williamsburg 1977
(8) DE-OS No. 29 31 092 (corresponding to U.S. Pat. No. 4,221,825)
(9) B. J. Ainslie, C. R. Day, P. W. France, K. J. Beales, G. R. Newns, Electron. Lett. 15 (1979) 411
(10) J. W. Fleming, V. R. Raju, Electron. Lett. 17 (1981) 867.

In the manufacture of fused silica optical fibers according to both the thermally activated MCVD method (publications 2, 3, 9) and in plasma-activated manufacturing processes (publications 4, 5, 6, 7, 10) fluorine may be used as a dopant. The following compounds may serve as fluorine sources: $SiF_4$(2, 4, 5), $NF_3$, $SF_6$ (8), $CCl_2F_2$(3,8) and $CF_4$(2, 9). By using the MCVD method it is possible to produce glass layers with refractive index differences of approximately 0.5% by fluorine doping (2, 3). However, relatively large quantities of fluorine compound have to be consumed to reach these values. According to (2), a difference in refractive index of 0.5% is reached only with a $SiF_4/SiCl_4$ ratio of 12:1. The large excess of $SiF_4$, however, degrades the deposition from the gas phase. Therefore, in the MCVD process fluorine is usually used only together with other dopants (9, 10).

The use of plasma activation under normal pressure (6, 8) and at low pressure (4, 5) permits the production of glass layers with differences in refractive index of 1% (7) and 1.3% (5), respectively. In these multimode optical fibers doped with fluorine only, optical attenuations of 2.2 dB/km at 1060 nm were realized. Monomode optical fibers have so far not been manufactured in this manner. A high fluorine compound concentration, as compared to the $SiCl_4$, in the gaseous phase is also required in this process.

SUMMARY OF THE INVENTION

It is an object of the invention to produce glass layers having increased differences in refractive index, while reducing the quantity of fluorine compound to be used in the production of such layers.

According to the invention this object is achieved in that hexafluoroethane ($C_2F_6$) is used as a fluorine source in a CVD method.

As a CVD method, preferably the low-pressure PCVD method is used. This method is described in the publication by P. Geittner, D. Küppers and H. Lydtin entitled "Low-loss optical fibers prepared by plasma-activated chemical vapor deposition (CVD)" (Applied Phys. Lett., Volume 28, No. 11, pages 645–646, June 1976). and in the DE-PS No. 24 44 100 corresponding to U.S. Pat. No. Re. 30,635). The contents of these publications is hereby incorporated as a reference.

DESCRIPTION OF THE PREFERRED EMBODIMENTS

Figure 1:
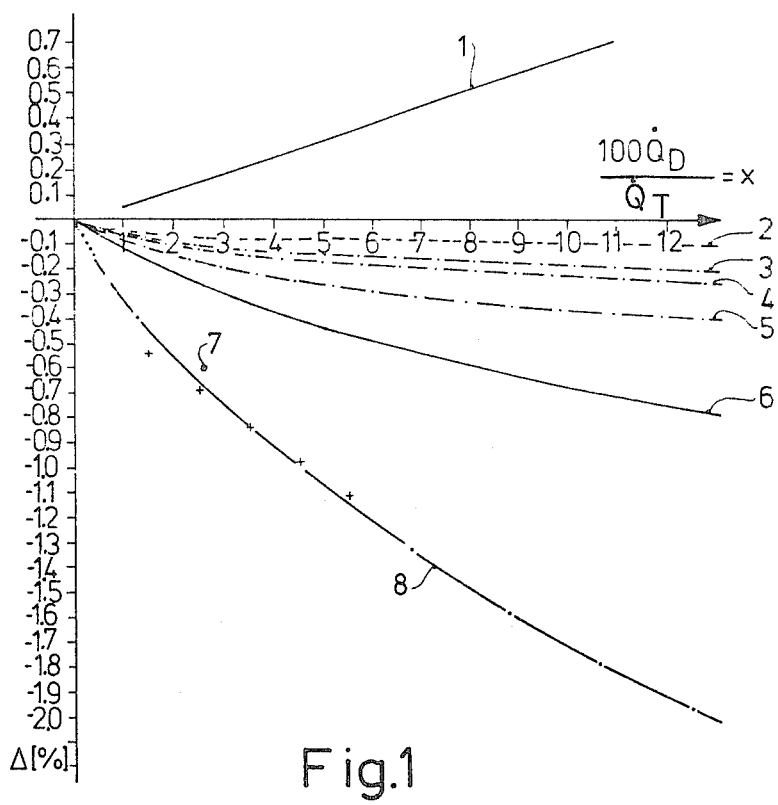
FIG. 1 is a graph showing the differences in refractive index between doped and undoped silica glass layers as a function of the concentration, in the gaseous phase, of the fluorine compound used to make the doped layers. Curves are shown for various methods and for various fluorine dopant-providing compounds.

In FIG. 1 the differences in refractive index (in per cent) between doped and undoped silica glass layers are plotted against the concentration, $$x = \frac{100 \, \dot{Q}_D}{\dot{Q}_T},$$

in the gas phase, of fluorine dopant-producing compound. In this equation, $\dot{Q}_D$ is the gas flow of the fluorine compound, and $Q_T$ is the total gas flow. The individual curves represent values for the following methods, systems, and dopants, respectively:

1 PCVD method, system $FeO_2/SiO_2$,
2 MCVD method according to Publication (2),
3 Method according to Publication (8), fluorine compound $CCl_2F_2$,
4 Method according to Publication (8), fluorine compound $NF_3$,
5 Method according to Publication (8), fluorine compound $SF_6$,
6 PCVD method, system $F/SiO_2$ with $SiF_4$ as a fluorine source, Publication 5,
7 Monomode preform manufactured according to the invention.
8 PCVD method, system $F/SiO_2$ with $C_2F_6$ as a fluorine source.

FIG. 1 shows that it is possible according to the invention by using $C_2F_6$ (hexafluoroethane "Freon 116") to achieve differences in refractive index of more than 2% (See, curve 8). This is an increase of more than 50% as compared to the highest values reached so far in systems with pure fluorine doping and pure germanium dioxide doping.

The invention also permits the manufacture of optical fibers with a numerical aperture of more than 0.3% while using only fluorine as a dopant. As appears from FIG. 1, a further advantage of the present invention is that very high differences in refractive index can be achieved with very small concentrations, in the gaseous phase, of the dopant $C_2F_6$. A difference in refractive index of 1% is already reached with a ratio of $C_2F_6/SiCl_4$ of approximately 0.05. hexafluoroethane is therefore to be considered as an extraordinarily active fluorine source when used according to the invention. Also, when $C_2F_6$ is used according to the invention, attenuation values of 1.5 dB/km at 1050 nm are achieved.

By means of the PCVD method and while using $C_2F_6$, monomode optical fibers consisting of a cladding of silica glass, an intermediate layer whose refractive index has been reduced by fluorine doping, as well as a pure silica core were manufactured.

Figure 2:
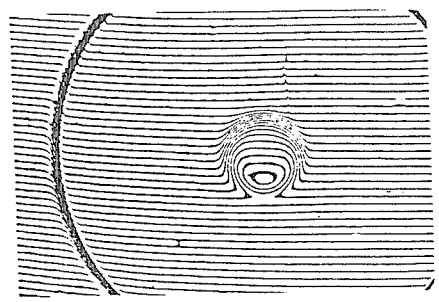
FIG. 2 shows a Michelson interference-micro-graph of a preform for a monomode optical fiber.

FIG. 2 shows a Michelson-interference micrograph of such a monomode optical fiber. Such a fiber is advantageous because the core consists of pure silica glass and consequently has a smaller Rayleigh scattering than fiber cores with doping. Moreover, during collapsing of inner-coated tubes to form fibers, dopants may evaporate out of the core material. This results into a so-called dip in the refractive index profile. As the inner-coated tubes manufactured according to the invention have only silica on the inner surface, the described dip in the refractive index no longer occurs.

Monomode, fibers manufactured according to the invention hence show a lower sensitivity to bending then fibers with a doped core which were also manufactured via an internal coating method.

The invention will now be described in greater detail with reference to specific examples. The examples generally correspond to the examples for the PCVD method described in the Publications (4) and (5) in which hexafluoroethane $C_2F_6$ was used as a dopant instead of $SiF_4$.

EXAMPLE 1

A constant $SiCl_4$ flow of 40 sccm with approximately 220 sccm oxygen and 1 sccm $C_2F_6$ was passed through a silica tube (length 188 cm, outside diameter 14.2 mm, inside diameter 11.8 mm) for approximately 150 minutes (sccm being the equivalent gas flow Q in $cm^3$ of gas per minute at 1 bar at $0°$ C.) The pressure inside the tube is approximately 10 to 14 mbar. During this period of time the outer wall of the tube is heated to approximately $1150°$ C. A microwave resonator with 200 W power absorption reciprocates along the tube at 3.5 m/minute and induces the deposition of fluorine-containing vitreous silica layers. Finally a few $SiO_2$ layers without $C_2F_6$ addition were deposited. The coated tube was then processed to form a monomode fiber. The core of this fiber as well as the cladding consist of pure silica. the intermediate layer has a refractive index which is reduced by approximately 0.5 to 0.6%.

EXAMPLE 2

By means of the method described in Example 1, with the variation that the gaseous composition contained between 0.05 and 5.7 sccm $C_2F_6$, differences in refractive index between 0.05% and 2.0% were produced.

What is claimed is:

1. A method of manufacturing fluorine-doped optical fiber preforms comprising the steps of:
   providing gases or vapors of oxygen, $SiCl_4$, and $C_2F_6$;
   mixing the gases and vapors;
   passing the mixture through a glass tube having an inner wall;
   causing the mixture to react to produce at least one fluorine-doped glass layer on the inner wall of the tube, said layer having a refractive index; and
   providing at least one glass core layer on the fluorine-doped glass layer, said glass layer having a refractive index greater than the refractive index of the fluorine-doped layer.

2. A method as claimed in claim 1, characterized in that:
   the mixture is caused to react by generating a nonisothermal plasma zone within the tube; and
   the plasma zone is moved back and forth along the length of the tube.

3. A method of manufacturing flourine-doped preforms for monomode optical fibers, comprising manufacturing a preform as claimed in claim 2, characterized in that:
   the glass tube is an undoped silica tube; and
   the glass core layer is undoped silica.

4. A method of manufacturing fluorine-doped preforms for monomode optical fibers, comprising manufacturing a preform as claimed in claim 1, characterized in that:
   the glass tube is an undoped silica tube; and
   the glass core layer is undoped silica.

5. A method of manufacturing layers of fluorine-doped glass comprising the steps of:
   providing gases or vapors of oxygen, $SiCl_4$ and $C_2F_6$;
   mixing the gases and vapors;
   passing the mixture over a substrate; and
   causing the mixture to react to produce at least one fluorine-doped glass layer on the substrate.

* * * * *